(12) United States Patent
Losey

(10) Patent No.: US 6,606,492 B1
(45) Date of Patent: Aug. 12, 2003

(54) KEYLESS ENTRY SYSTEM

(75) Inventor: Allan D. Losey, Ortonville, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 364 days.

(21) Appl. No.: 09/668,758

(22) Filed: Sep. 22, 2000

Related U.S. Application Data

(60) Provisional application No. 60/156,046, filed on Sep. 24, 1999.

(51) Int. Cl.$^7$ ............... H04M 1/66; H04M 1/68; H04M 3/16
(52) U.S. Cl. ............... 455/411; 340/5.2; 340/5.72; 307/10.2
(58) Field of Search ............... 455/127, 411; 340/5.2, 5.61, 5.62, 5.63, 825.69, 825.72, 5.72; 307/10.1, 10.2; 380/270

(56) References Cited

U.S. PATENT DOCUMENTS

| | | | |
|---|---|---|---|
| 4,672,375 A | | 6/1987 | Mochida et al. |
| 5,079,435 A | | 1/1992 | Tanaka |
| 5,319,364 A | * | 6/1994 | Waraksa et al. ........... 340/5.64 |
| 5,751,072 A | | 5/1998 | Hwang |
| 5,783,994 A | | 7/1998 | Koopman, Jr. et al. |
| 5,905,431 A | * | 5/1999 | Mueller et al. ............. 340/426 |
| 6,031,465 A | * | 2/2000 | Burgess .................... 340/5.54 |
| 6,034,617 A | * | 3/2000 | Luebke et al. ............. 340/5.62 |
| 6,181,254 B1 | * | 1/2001 | Vogele ................... 340/825.69 |
| 6,236,333 B1 | * | 5/2001 | King .......................... 340/5.61 |

FOREIGN PATENT DOCUMENTS

| | | |
|---|---|---|
| EP | 1 046 771 A1 | 10/2000 |
| GB | 2317037 A | 3/1998 |

OTHER PUBLICATIONS

International Search Report mailed Jan. 30, 2001.

* cited by examiner

*Primary Examiner*—Thanh Cong Le
*Assistant Examiner*—Andrew T Harry

(57) ABSTRACT

A keyless entry system includes a controller that operates in one of two modes. When an authentication signal is received from a passive signaling device, the controller operates in one mode that permits more convenient access to a user. When an authentication signal is not received from the passive signaling device, the controller requires another mode of operation from a manually operable signaling device. In one example, the manually operable signaling device is a numeric keypad. When an authentication signal from the passive signaling device is received, any single key can be manipulated to gain the desired access controlled by the system. When no authentication signal is present from the passive signaling device, then the controller preferably requires a specific sequence of key activation before access is permitted.

16 Claims, 1 Drawing Sheet

KEYLESS ENTRY SYSTEM

REFERENCE TO RELATED APPLICATIONS

This application claims priority to U.S. Provisional Application No. 60/156,046 filed on Sep. 24, 1999.

BACKGROUND OF THE INVENTION

This invention relates to keyless entry systems. More particularly, this invention relates to a keyless entry system having a passive signaling device and a controller that operates in more than one mode depending on the presence of the passive signaling device.

There are a variety of keyless entry systems currently available. One use for such systems is for gaining access to a vehicle. The systems also sometimes provide the ability to remotely control various features of the vehicle such as an ignition switch.

There are problems with the currently available keyless entry systems. One example is the possibility for the signal from a remote signaling device (i.e., a keyfob) to be intercepted and later copied by an unauthorized individual such as a car thief. One attempt at avoiding such signal interception has been to encrypt the signals from the remote transmitter.

Another keyless entry system feature is a keypad mounted on an exterior panel of the vehicle, such as a door. A difficulty associated with such keypads is that encryption is not possible because an individual must manually enter the code each time access to the vehicle is required. Another difficulty associated with such keypads is they frequently have toggled buttons such that each side of the switch is used for a different portion of the entry code. These toggled switch arrangements provide a more aesthetic keypad because it is smaller, however, there is an increased risk that the wrong number will be entered by the user.

Another feature of some keyless entry systems is a passive device such as a card or a key head that provides a signal to the system without requiring any button or switch activation by the user. One drawback associated with such passive devices is that they must be held in very close proximity to the vehicle. This often results in annoying the user who has to hold the device very close to the vehicle before the device operates properly. Passive devices that provide stronger signals and do not require such close proximity are not without drawbacks. Stronger signaling passive devices can result in inadvertent activation of the system by casually passing by the vehicle even when the user does not wish to activate the keyless entry system.

Another difficulty associated with the remote signaling devices is the possibility for an individual to leave the device in the vehicle by accident. This presents a difficulty in allowing the user to gain access to the vehicle if the remote signaling device is locked within the vehicle. Another difficulty with such situations is when the vehicle is left unlocked, and an unauthorized user may gain access to the remote signaling device and, consequently, have full access to the vehicle.

There is a need for a keyless entry system that balances the considerations of providing relatively easy access to the vehicle for an authorized user while simultaneously providing enough safeguards to make the system secure and effective. This invention balances those needs in a manner superior to previously proposed keyless entry systems.

SUMMARY OF THE INVENTION

In general terms, this invention is a keyless entry system that operates in one of two modes depending on the presence of a passive signaling device. The system includes a passive signaling device that automatically provides an authentication signal. At least one other signaling device provides an access signal upon some manual activation by a user. A controller determines whether an authentication signal has been received from the passive signaling device. When a proper authentication signal is received, the other signaling device can be operated in one of two possible modes of operation. If no authentication signal is received from the passive signaling device, only one mode of operation of the other signaling device is acceptable before the controller will allow access to the vehicle.

In one example, the other access device is a keypad on the vehicle. When the passive signaling device provides a proper authentication signal, pressing any number on the numeric keypad results in the controller permitting access to the vehicle. If the passive signaling device is not present, however, a specific code must be entered using multiple keys on the numeric keypad before the controller will allow the desired access to the vehicle.

The various features and advantages of this invention will become apparent to those skilled in the art from the following detailed description of the currently preferred embodiment. The drawings that accompany the detailed description can be briefly described as follows.

DETAILED DESCRIPTION OF A PREFERRED EMBODIMENT

Figure 1:
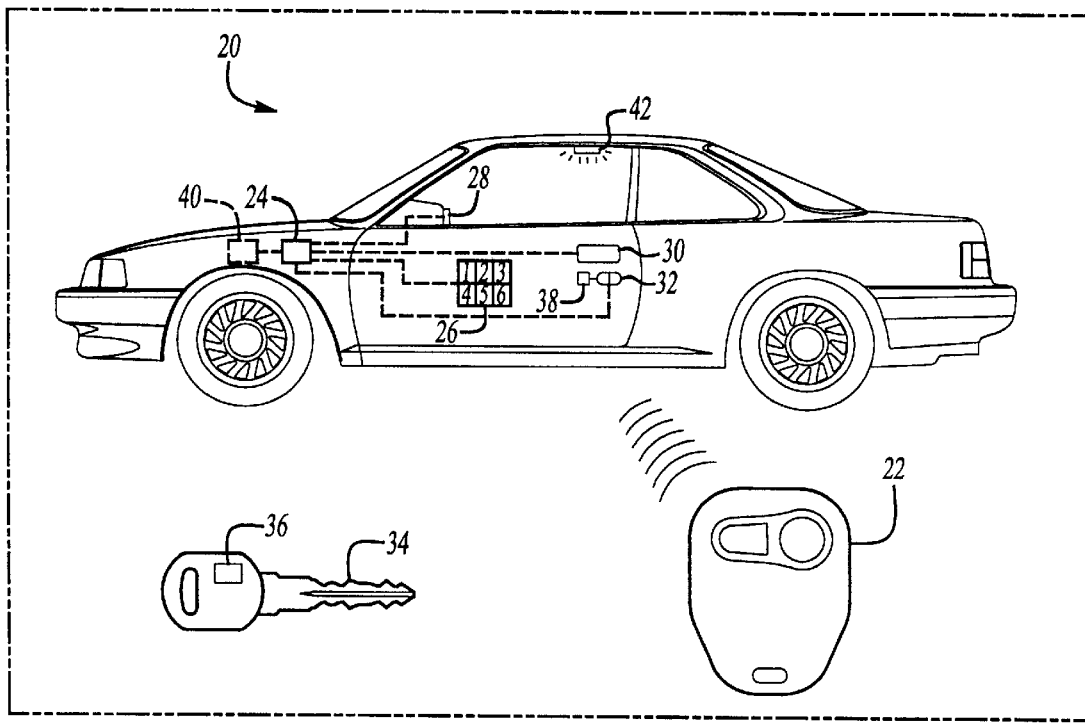
FIG. 1 diagrammatically illustrates a system designed according to this invention.

A keyless entry system 20 includes a passive signaling device. In the illustrated example, one passive signaling device 22 is a card that is easily carried by a user. The passive signaling device 22 includes a transmitter that provides an authentication signal to a system controller 24 without requiring any manual activation by the user. The passive signaling device 22 preferably must be placed within a certain vicinity of the vehicle before the controller 24 will recognize the authentication signal from the passive signaling device 22.

Another signaling device 26 is provided on the exterior of the vehicle. In the illustrated example, the other signaling device 26 is a keypad. In one example, the keypad 26 is numeric. In another example, the keypad 26 is alphabetic. The controller 24 preferably is programmed to recognize a specific sequence entered by a user using the keypad 26 before access to the vehicle will be permitted. The keypad 26 preferably is dedicated to controlling the exterior locks on the vehicle.

Another keypad preferably is provided inside the vehicle. A keypad 28 can be supported on the dashboard of the vehicle, for example. An alternative location for the keypad 28 is the steering column or steering wheel. The keypad 28 preferably is operated to enter a code that is interpreted by the controller 24 for allowing the vehicle to be operated.

The controller 24 preferably also detects the manual operation of a door handle 30. A limit switch associated with the door handle 30 indicates when the door handle 30 has been moved to a position to open the door of the vehicle. Similarly, the controller 24 preferably conmmunicates with a manual door lock 32 to detect movement of the door lock when a user inserts an appropriate key.

In the illustrated example, a key 34 includes a transmitter portion 36. In this example, there preferably is a receiver adjacent the door lock 32 such that when the key 34 is inserted, a signal from the transmitter 36 is received by the receiver 38 and then processed by the controller 24. Additionally, the transmitter 36 may provide a signal remotely. The key 34 may be used instead of the card 22 or vice versa, depending on the desired configuration of the system. The transmitter 36 preferably provides a signal without requiring any manual activation of a switch or a button by the user. The key 34 with the transmitter 36 is another example of a passive signaling device.

In the illustrated example, an ignition kill switch 40 preferably controls when the ignition of the vehicle can be used to start the engine. The controller 24 preferably is programmed to enable or disable the ignition kill switch 40 depending on proper signals from the passive and/or manual signaling devices.

Another feature of the system 20 is that the controller 24 preferably is programmed to control the illumination of interior lights 42 inside of the vehicle. The lights 42 can be turned on, for example, when a user is entering the vehicle, which can be determined by the controller 24 based upon the activation of the keypad 26 or access of the door handle 30, for example.

The controller 24 preferably operates the system 20 in one of two modes depending on the presence of an authentication signal from the passive signaling device 22 or 34. Whenever there is no authentication signal from the passive signaling device, the controller 24 requires a first mode of operation of the keypad 26 before access to the vehicle is permitted. This first mode of operation preferably includes requiring a user to manually enter a specific sequence using the keypad 26. Additionally, the controller 24 preferably is programmed to require manual entry of a specific sequence using the keypad 28 before the ignition kill switch 40 will be disabled.

When a proper authentication signal has been received from the passive signaling device, however, the controller 24 preferably allows operation of the keypad 26 in a second mode. When an authentication signal is received, the user preferably is permitted to press any single button on the keypad 26 and access to the vehicle will be permitted. When a proper authentication signal from the passive signaling device has been received, operation of the keypad 28 preferably is no longer required to disable the ignition kill switch 40. In another example, only a single button need be pressed on the keypad 28 for the ignition kill switch 40 to be disabled after receipt of a proper authentication signal from the passive signaling device.

One scenario that this invention addresses beyond the normal expected operation is when a user inadvertently leaves the passive signaling device within the vehicle after exiting the vehicle. The controller 24 preferably determines when such a circumstance exists by monitoring the amount of time that the passive signaling device authentication signal is present. If that signal is present more than a predetermined maximum amount of time, which is two minutes in one example, then the controller 24 requires the first mode of operation of the keypad 26 before access to the vehicle is permitted.

The controller 24 preferably is programmed to control a variety of functions in the vehicle in different modes of operation. For example, the controller 24 preferably illuminates the lights 42 within the interior of the vehicle whenever a complete code has been entered on the keypad 26 or whenever a proper authentication signal from the passive signaling device has been received and the door handle 30 is manipulated to open the door. If an authentication signal has not been received, the controller 24 preferably prevents the lights 42 from being illuminated when the door handle 30 is manipulated. Only after a proper entry of a complete sequence on the keypad 26 results in the lights 42 being illuminated whenever the passive authentication signal is not received. Those skilled in the art that have the benefit of this description will realize that there are other possible configurations for the controller 24 to control a variety of vehicle features in one of two possible modes depending on the presence of an authentication signal.

Figure 2:
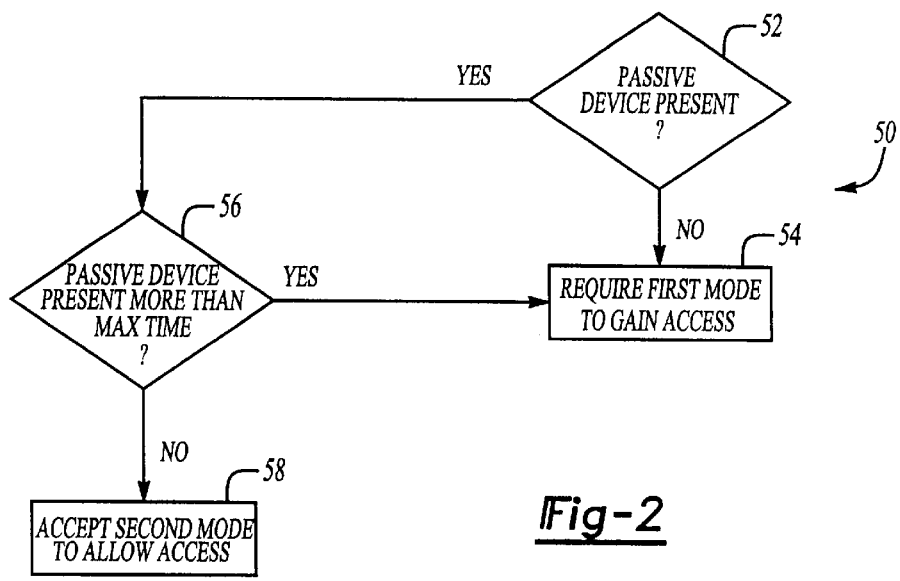
FIG. 2 is a flowchart diagram illustrating a portion of the method of this invention.

FIG. 2 is a flowchart diagram illustrating a strategy for the controller 24 to operate the system 20. A first step 52 in the flowchart 50 is when the controller 24 determines whether an authentication signal has been received from the passive signaling device. If no authentication signal has been received, the controller 24 preferably requires a first mode of operation before access to the vehicle will be permitted. As noted above, the first mode of operation in one example includes requiring complete entry of a sequence of digits or letters using the keypad 26. When a signal from the passive signaling device is detected, then the controller determines at 56 whether that signaling device has been present more than a preselected maximum amount of time. This accommodates situations where the signaling device has been left in the vehicle inadvertently, for example. If the passive authentication signal is present for more than the maximum amount of time, then the first mode of operation is required before access to the vehicle is permitted. If the preselected maximum amount of time has not been exceeded, then the controller moves into the second mode of operation at 58 and allows access to the vehicle upon an acceptable manipulation of a single key on the keypad 26, for example.

This invention provides more than one mode of operation of the keyless entry system depending on the presence of a proper authentication signal from a passive signaling device. The combination of more than one signaling device and the operation in more than one mode of operation provide a system that gives additional convenience to a user while still ensuring proper security.

Given this description, those skilled in the art will be able to realize the features and functions of the controller 24 by selecting from among commercially available microprocessors or designing custom software or circuitry to fit the needs of their particular situation.

The preceding description is exemplary rather than limiting in nature. Variations and modifications to the disclosed embodiments may become apparent to those skilled in the art that do not necessarily depart from the purview and spirit of this invention. The scope of legal protection given to this invention can only be determined by studying the following claims.

I claim:

1. A keyless entry system, comprising:
   a passive signaling device that automatically provides an authentication signal;
   at least one other signaling device that provides a signal upon manual activation by a user; and
   a controller that requires a first mode of operation of the other signaling device when no authentication signal is received by the controller from the passive signaling device and permits operation of the other signaling device in a second mode of operation when an authentication signal from the passive signaling device is received.

2. The system of claim 1, wherein the other signaling device comprises a keypad supported on a vehicle.

3. The system of claim 2, wherein the keypad is supported on an exterior of the vehicle and a signal from the keypad is interpreted by the controller to permit access to the vehicle.

4. The system of claim 2, wherein the keypad is supported on an interior portion of the vehicle and the controller interprets signals from the keypad to disable an ignition kill switch.

5. The system of claim 2, wherein the first mode of operation includes requiring a sequence of key operation using the keypad and the second mode of operation includes accepting activation of any single key on the keypad.

6. The system of claim 1 including an interior light in a vehicle and a manually manipulated door handle on the vehicle and wherein the controller illuminates the interior light upon manual manipulation of the door handle only when an authentication signal from the passive signaling device is received by the controller.

7. The system of claim 1, wherein the passive signaling device comprises a transmitter on a card.

8. The system of claim 1, wherein the passive signaling device comprises a transmitter on a key.

9. The system of claim 1, wherein the other signaling device provides a first signal to the controller in the first node of operation and a second signal to the controller in the second mode of operation.

10. The system of claim 1, wherein the other signaling device is capable of providing a plurality of signals to the controller, each of the signals indicating a different manual activation of the other signaling device.

11. A method of controlling a keyless entry system having a passive signaling device and at least one other signaling device that requires manual operation, comprising the steps of:

(a) determining whether an authentication signal is received from the passive signaling device;

(b) operating the system in a first mode of operation responsive to a first manual operation of the other signaling device when no authentication signal is received; and (c) operating the system in a second mode of operation responsive to a second manual operation of the other signaling device when an authentication signal is received.

12. The method of claim 11, including determining an amount of time that the authentication signal is present and operating the system in the second mode of operation only when the authentication signal has been present for less than a predetermined maximum.

13. The method of claim 12, including operating the system in the first mode of operation when the authentication signal has been present for more than the preselected maximum.

14. The method of claim 11, including operating the system in a first mode of operation that requires a first manner of manually manipulating the other signaling device and the second mode of operation includes accepting an alternative manner of operating the other signaling device.

15. The method of claim 11, wherein the other signaling device comprises a keypad and step (b) includes requiring a sequence of keypad manipulations.

16. The method of claim 11, wherein the other signaling device comprises a keypad and step (c) includes requiring only a single key manipulation.

* * * * *